Aug. 20, 1957     W. F. STRUNA     2,803,069
CLASSROOM TEACHING DEVICE
Filed May 31, 1956
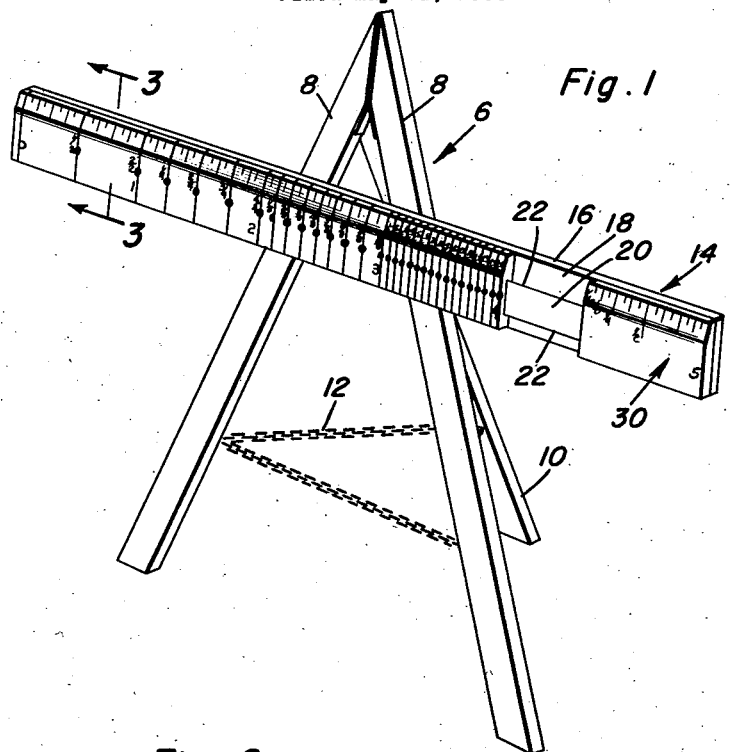
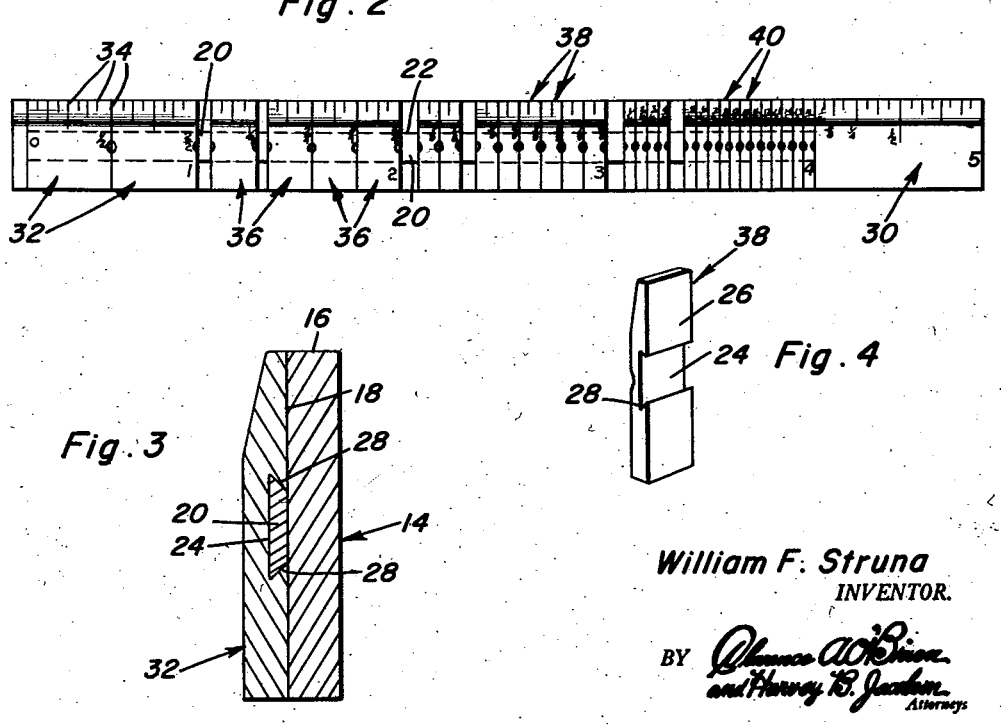
William F. Struna
INVENTOR.

United States Patent Office 2,803,069
Patented Aug. 20, 1957

2,803,069

CLASSROOM TEACHING DEVICE

William F. Struna, Lima, Ohio

Application May 31, 1956, Serial No. 588,466

2 Claims. (Cl. 35—31)

The present invention relates, broadly classified, to educational appliances and devices and has references, more particularly construed, to a portable device which is expressly, but not necessarily, adapted for use in a classroom to assist a teacher or an instructor to familiarize students with the purpose and use of a ruler and how the components portions thereof may be utilized in an understanding of units, fractions of units, along with the addition and/or subtraction of fractions.

Stated along other lines the invention pertains to what may be construed as a huge or over-size teaching device through the medium of which the classroom teacher may disclose precisely what a measuring ruler looks like, how it is constructed and provided with a straightedge and suitably marked and graduated components but, what is more important, how, by making the so-called calibrated or graduated components in the form of slidably mounted parts or blocks, the latter may be proportioned and grouped to serve as demonstrating blocks indicative of fractions ranging from halves, to quarters, to eighths and sixteenths of an inch.

In carrying out the concept the oversized demonstrating and informative ruler is placed on an easel or the like and is in representation of the usual one-foot ruler in use, or to be put into use, by the teacher. Differing from the one-foot ruler, however, this classroom visual instruction aid may be classed as a jumbo ruler, as it were, the same being some five feet more or less in length and each foot component thereof being indicative of a graduated and marked inch on the regular one-foot desk-type ruler.

More explicity, the calibrated or graduated and marked face of the ruler is not only constructed in the aforementioned 12 to 1 ratio but the "face" of the ruler is made up of at least one fixed "inch" block while the rest of the "inch" blocks are in and of themselves made up of individual blocks one of which, for example, represents two half inches, and the next one of which is made up of four blocks and represents four quarter-inch components.

With the above and in the beginning of the study of fractions the device therefore performs to enable the teacher to show that the first inch is divided into halves and that the two halves combined form one inch, this being shown and explained by utilizing the half sections or individual blocks which, grouped together, constitute the full inch made up of two half inch blocks.

Other features and advantages and objectives will become more readily apparent from the following description and the accompanying sheet of illustrative, but not restrictive, drawings.

In the drawings wherein like numerals are employed to designate like parts throughout the views:

Fig. 1 is a perspective view of the easel with the classroom instruction type ruler constituting the invention;

Fig. 2 is a front elevation of the same illustrating how the blocks of the over-all block assembly are grouped and associated in their instruction and teaching work;

Fig. 3 is a section on an exaggerated scale taken on the like 3—3 of Fig. 1 looking in the direction of the arrows; and Fig. 4 is a perspective view showing the common construction of the aforementioned movable or shiftable blocks.

Referring now to the drawings and with respect to Fig. 1 the support, or stand may take the form of an easel 6. This comprises the tripodal legs 8 and 10 hingedly or otherwise connected at their upper ends and chained for stabilization as at 12. Any suitable means may be provided to apply and support the classroom oversized teaching ruler on the easel. The ruler as an entity is denoted by the numeral 14. In over-all appearance it is merely a huge replica of what would be called a standard or conventional desk-type ruler. That is to say, one may assume that this "ruler," like any other one, is an instrument for measuring purposes and has a straightedge, that it is calibrated or graduated and so marked as to define a progression or succession of inch area portions. Each inch is in turn so graduated with customary lines or graduations to divide each inch into halves, quarters, eighths and sixteenths. The difference between this ruler and the small type is that each "inch" is approximately one foot long making the ruler based on the ratio of 12 to 1. This is merely exemplary of the principle of construction involved. The primary distinction is in utilizing a multi-part or sectional ruler construction. That is to say, instead of being a solid one-piece construction the back of the ruler which constitutes the base here is a solid elongate member 16. It is rectangular in form and on its forward surface 18 (Fig. 1) it has a central lengthwise rib or key 20. The longitudinal edges are undercut as at 22 so that the key is dovetailed in cross-section. This key serves to accommodate the correspondingly shaped mortises or keyways 24 in the back surfaces 26 of the face components or parts. One of these is shown for example in Fig. 4 and it will be seen that the surface 26 is flat and slides against the surface 18 and that the edges of the notch undercut as at 28 to provide the dovetailed shaped cross-section. In other words, we have here a mortise which is shiftably keyed on the rib. Referring now to the right hand end of the ruler in Fig. 1 it will be seen that the last inch or the so-called 5th inch is fixed and solid and of one-piece construction and is conveniently denoted by the numeral 30. This represents to the student's eye an ordinary inch part or component and may be the point of orientation from which the other factors are ascertained and demonstrated by the teacher. That is to say, it is graduated as shown and the graduations are identified with the fraction marks.

It will be evident that the inch component at the left in Fig. 2 for example is made up of two half-inch blocks or sliding sections and these are conveniently denoted by the numerals 32. They have customary graduations 34 and fraction markings printed thereon. Also the numeral "1" appears to show that this, even though it is actually one foot in length, represents one inch. The next inch is made up of four blocks 36 all identical in size, shape and appearance so that they represent to the mind of the student reader the factors in respect to relative sizes of which the teacher desires to impart to the students. The next sections 38 are grouped into a series or group of eight representing eighth inch components and the final ones of which there are sixteen are denoted by the numeral 40 and these represent one-sixteenth measurements. It follows that the invention is a portable manipulative device which aids one in teaching and instructing using the huge ruler as a basis for demonstrating proportionate sizes, units, fractions and the addition and subtraction of the same. It is so constructed that all of the parts may be moved from side-to-side so that each part or fraction may be viewed separately. All the sections or parts may be moved together in a group to form whole units of an inch. The device may be adapted to teach fractions or any measurements or division as is evident. Although the blocks may be mounted or keyed in some other manner they are preferably constructed and utilized as shown.

It will be evident that the addition of fractions is done by moving the segments or blocks together, each additional block automatically added on any of the above illustrating the particular point which the teacher has in mind. As is clear the segments or blocks are of different sizes and when combined are equal to one foot in length for each inch represented. The four quarter sections combined equal one foot in length and the eighth inch segments combine to equal one foot in length and so on. In connection with the subtraction of fractions this would be just the reverse of the addition of fractions, as is obvious, having one inch or one unit and taking away a one-half unit and arriving at the result of a one-half part of the unit.

Actually and as before pointed out the device is to the teacher and user a large ruler of five feet made up of movable blocks or so-called segments in various sizes. Fractions or parts of an inch are dramatically shown in large size so that it can be used in classroom, lecture halls and/or from stages. One inch can be shown as two halves, four quarters, eight eighths and sixteen sixteenths all as is clearly obvious.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. For use by a teacher in a classroom, a visual ruler-like instruction device comprising a ruler five feet, more or less, in length adapted to be supported on an easel or the like at the front of the classroom and sufficiently large in size that it may be conveniently used by the pupils as the teacher points to varying information given thereon, said ruler comprising a horizontally elongated body member with parallel upper and lower edges, stops fixed to the front face of said body at the left hand and right hand ends thereof, the stop at the right hand end comprising an outstanding block the face of which is suitably calibrated to represent a stationary inch unit, a plurality of blocks also suitably calibrated and slidably mounted on the front of said body toward and from each other and said stationary block and representing selectively usable movable inch units, each movable inch unit being made up of a plurality of blocks, the two blocks of the inch unit at the left each representing a half inch and conjointly representing an inch measurement, the next movable inch unit comprising four equal individually slidable blocks each representing a quarter-inch measurement and collectively representing an inch measurement, the next succeeding movable inch unit comprising eight blocks of equal size which collectively represent an inch measurement and individually represent a measurement of one-eighth of an inch, the remaining movable unit likewise comprising a plurality of blocks each representing one-sixteenth of an inch and when grouped together representing an inch, all of said movable blocks being individually and collectively movable relative to said body in varying numerical and mathematical relationship and therefore being usable singly and collectively at the will of the teacher.

2. The structure defined in claim 1 and wherein said body is provided at the median portion of the front face with a lengthwise keying rib, the rearward faces of all of the movable blocks being grooved and slidably mounted on said rib, whereby all of the blocks in conjunction with said body constitute a structural entity which in over-all appearance represents what is in effect a huge ruler.

References Cited in the file of this patent

UNITED STATES PATENTS

| D. 168,834 | Farinacci | Feb. 17, 1953 |
| 973,905 | Alexander | Oct. 25, 1910 |
| 1,174,689 | Coleman | Mar. 7, 1916 |
| 1,414,849 | Williams | May 2, 1922 |

FOREIGN PATENTS

| 9,171 | Great Britain | 1904 |
| 21,778 | Netherlands | Mar. 16, 1930 |
| 25,302 | Great Britain | 1904 |